Patented Sept. 4, 1951

2,567,077

UNITED STATES PATENT OFFICE 2,567,077

MANUFACTURE OF DOLOMITE BRICKS

Herbert Ernest Moon, London, England

No Drawing. Application April 2, 1949, Serial No. 85,269. In Belgium April 9, 1948

4 Claims. (Cl. 106—61)

The present invention relates to the manufacture of dolomite bricks and it is an object of the invention to provide a simple and economical process by means of which dolomite bricks can be produced which are satisfactory in use.

Numerous processes have been proposed for the manufacture of dolomite bricks with the object of producing bricks which are not subject to a natural tendency generally possessed by such products to become hydrated. It has been proposed in particular, to add water to dolomite which has been calcined and crushed and mixed with additional products which are likely to resist hydration of the brick, such as kaolin and felspar and the said mixture then being moulded and baked. In another process, the dolomite which has been slightly calcined and crushed and mixed with mineral substances which have a hydration-inhibiting action, is subjected to two successive baking operations; the first after mixing with the hydration inhibitors and moulding with water, and the second after crushing the product from the first baking operation followed by further mixing with hydration inhibitors and moulding with the aid of a non-aqueous binder such as oil or tar.

By means of these processes, which necessitate the presence of relatively large proportions (from 10 to 20%) of silicated and aluminous products, it is possible to obtain refractory bricks which can be preserved for years without becoming hydrated. In the latter process, however, the initial partial calcination and the mixing with hydration inhibitors and water, however, are very delicate operations, and although good results are obtained with this process, it is slow, complicated and very expensive to carry out.

According to the present invention, there is provided a process for the manufacture of dolomite bricks wherein sintered dolomite is mixed with a minor proportion of hydration inhibitors and a quantity of non-aqueous binder just sufficient to permit moulding and wherein the non-aqueous mixture is moulded to a desired form of brick and subjected to a single baking operation at high temperature.

The sintered dolomite employed as starting material is a commercial product which, although free from $CO_2$, withstands exposure to air for a number of weeks without becoming hydrated. It is obtained by sintering crude dolomite at very high temperature (up to 1800° C.) this operation being accompanied by considerable contraction, which is not repeated during the baking of the brick.

The non-aqueous binder is preferably one which is liquid at room temperature, as for example the oils known as gas oil and fuel oil. However, it is also possible to employ semi-liquid or solid products such as paraffin or wax, which can readily be liquefied.

It has been discovered that, contrary to previous practice, it is possible in the present process to employ relatively small quantities of silicious and aluminous hydration inhibitors in a proportion by weight of less than 10% to obtain bricks which behave admirably in high-temperature furnaces and still have a resistance to hydration which enables them to be stored without disadvantage for several weeks.

One example of the present process is given in greater detail below:

The sintered dolomite is crushed and 5% lime, 2% kaolin and 2% felspar are added thereto, these quantities being by weight. The lime, which may be dolomite lime, preferably (but not necessarily) consists of a mixture in a ratio of about 4 to 1 respectively of dead burnt lime free from carbon dioxide and lime containing a proportion of about 10% by weight or residual carbon dioxide. After thorough mixing of the sintered dolomite and added hydration inhibitors, a non-aqueous binder, for example oil (gas oil), is incorporated therein in a quantity sufficient to enable it to be moulded. It is found convenient to add about 3 gallons of oil for every 4 cwts. of the mineral ingredients. The mixture is then moulded to the desired shape and subjected to baking at a temperature of at least 1500° C. The baking is advantageously carried out in a continuously operating furnace and may last three days or more.

After removal from the furnace, the bricks can be preserved without deterioration in the air for a certain time, but not so long as bricks which have undergone baking a number of times. On the other hand, they are more suitable for use in furnaces and steel converters than the latter type of bricks.

It will be understood that the term "brick" as employed in the present specification includes not only bodies moulded to a form commonly adopted for clay bricks, but includes blocks moulded (e. g. pressed) in any desired form as may be required, for example, for a furnace or converter lining element.

The proportions given by way of example of the various constituents can also be modified, as can the nature of the added hydration inhibitors. The present process can be carried out very economically and does not require any expensive or special installation.

I claim:

1. A process for the manufacture of dolomite bricks wherein sintered dolomite is mixed with about 10% by weight of an hydration inhibiting mixture of lime, kaolin and felspar and an oil binder and wherein the mixture of sintered dolomite, hydration inhibitor and oil binder is moulded to a desired form and subjected to a single baking operation to produce the brick.

2. A process as claimed in claim 1, wherein the dolomite, which has previously been sintered at about 1800° C. and crushed, is mixed with about 5% lime, 2% kaolin and 2% felspar with the further addition of a petroleum oil distillate as a binder and wherein the mixture is moulded and baked at a temperature of the order of 1500° C. or more.

3. A process as claimed in claim 2 wherein the added lime consists of a mixture in a ratio of about 4 to 1 respectively of dead burnt lime free from carbon dioxide and lime containing a proportion of about 10% by weight of residual carbon dioxide.

4. A process as claimed in claim 2 wherein a gas oil binder is added in a proportion of about 3 gallons to each 4 cwts. of mineral mixture.

HERBERT ERNEST MOON.

REFERENCES CITED

The following references are of record in the file of this patent:

UNITED STATES PATENTS

| Number | Name | Date |
|---|---|---|
| 2,103,249 | Eells | Dec. 28, 1937 |

FOREIGN PATENTS

| Number | Country | Date |
|---|---|---|
| 4,361 | Australia | 1932 |